(12) United States Patent
Force

(10) Patent No.: US 8,650,874 B2
(45) Date of Patent: Feb. 18, 2014

(54) ENGINE ASSEMBLY INCLUDING INTAKE BOOST SYSTEM

(75) Inventor: James E. Force, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 200 days.

(21) Appl. No.: 13/098,633

(22) Filed: May 2, 2011

(65) Prior Publication Data
US 2012/0279214 A1 Nov. 8, 2012

(51) Int. Cl.
*F02B 33/44* (2006.01)

(52) U.S. Cl.
USPC ........................................... 60/605.1; 60/611

(58) Field of Classification Search
USPC ................. 60/611, 605.1; 123/336, 561
See application file for complete search history.

(56) References Cited

U.S. PATENT DOCUMENTS

| | | | |
|---|---|---|---|
| 4,183,216 A * | 1/1980 | Tanaka et al. | 60/611 |
| 4,466,414 A * | 8/1984 | Yoshimura et al. | 123/564 |
| 4,760,703 A * | 8/1988 | Minami et al. | 60/605.1 |
| 7,182,050 B2 * | 2/2007 | Hitomi et al. | 123/58.8 |
| 7,765,806 B2 * | 8/2010 | Clark | 60/608 |
| 8,069,663 B2 * | 12/2011 | Ulrey et al. | 60/605.2 |
| 2010/0212315 A1 * | 8/2010 | Irisawa | 60/602 |

* cited by examiner

*Primary Examiner* — Thai Ba Trieu
*Assistant Examiner* — Ngoc T Nguyen
(74) *Attorney, Agent, or Firm* — Harness, Dickey & Pierce, P.L.C.

(57) ABSTRACT

An engine assembly includes an engine structure and an intake assembly. The engine structure defines a first cylinder, a second cylinder, a first intake port in communication with the first cylinder, and a second intake port in communication with the second cylinder. The intake assembly includes a first throttle valve, a second throttle valve and a boost mechanism. The first throttle valve is in communication with the first and second intake ports. The second throttle valve is in communication with an air source and the first throttle valve and located in a series flow arrangement between the air source and the first throttle valve. The boost mechanism is in communication with the air source and the first throttle valve and located in a series flow arrangement between the air source and the first throttle valve.

9 Claims, 3 Drawing Sheets

US 8,650,874 B2

ENGINE ASSEMBLY INCLUDING INTAKE BOOST SYSTEM

FIELD

The present disclosure relates to engine intake air flow arrangements.

BACKGROUND

This section provides background information related to the present disclosure which is not necessarily prior art.

Internal combustion engines may combust a mixture of air and fuel in cylinders and thereby produce drive torque. Combustion of the air-fuel mixture produces exhaust gases. Engines may include intake ports to direct air flow to the combustion chambers and exhaust ports to direct exhaust gases from the combustion chambers. An intake assembly may be used to direct air flow to the intake ports.

SUMMARY

An engine assembly may include an engine structure and an intake assembly. The engine structure may define a first cylinder, a second cylinder, a first intake port in communication with the first cylinder, and a second intake port in communication with the second cylinder. The intake assembly may include a first throttle valve, a second throttle valve and a boost mechanism. The first throttle valve may be in communication with the first and second intake ports. The second throttle valve may be in communication with an air source and the first throttle valve and located in a series flow arrangement between the air source and the first throttle valve. The boost mechanism may be in communication with the air source and the first throttle valve and located in a series flow arrangement between the air source and the first throttle valve.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
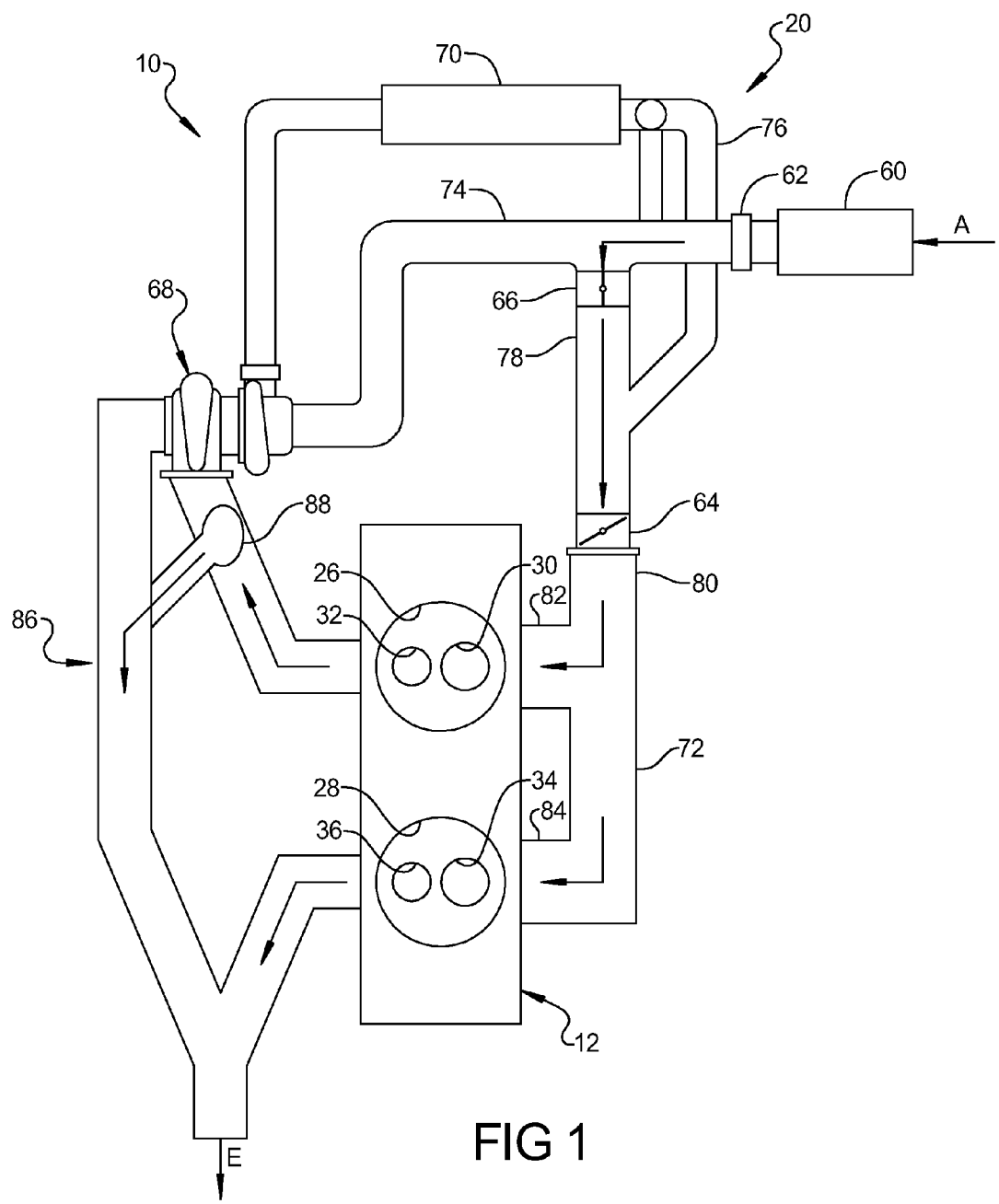
FIG. 1 is a schematic illustration of an engine assembly according to the present disclosure in a first operating mode.
Figure 2:
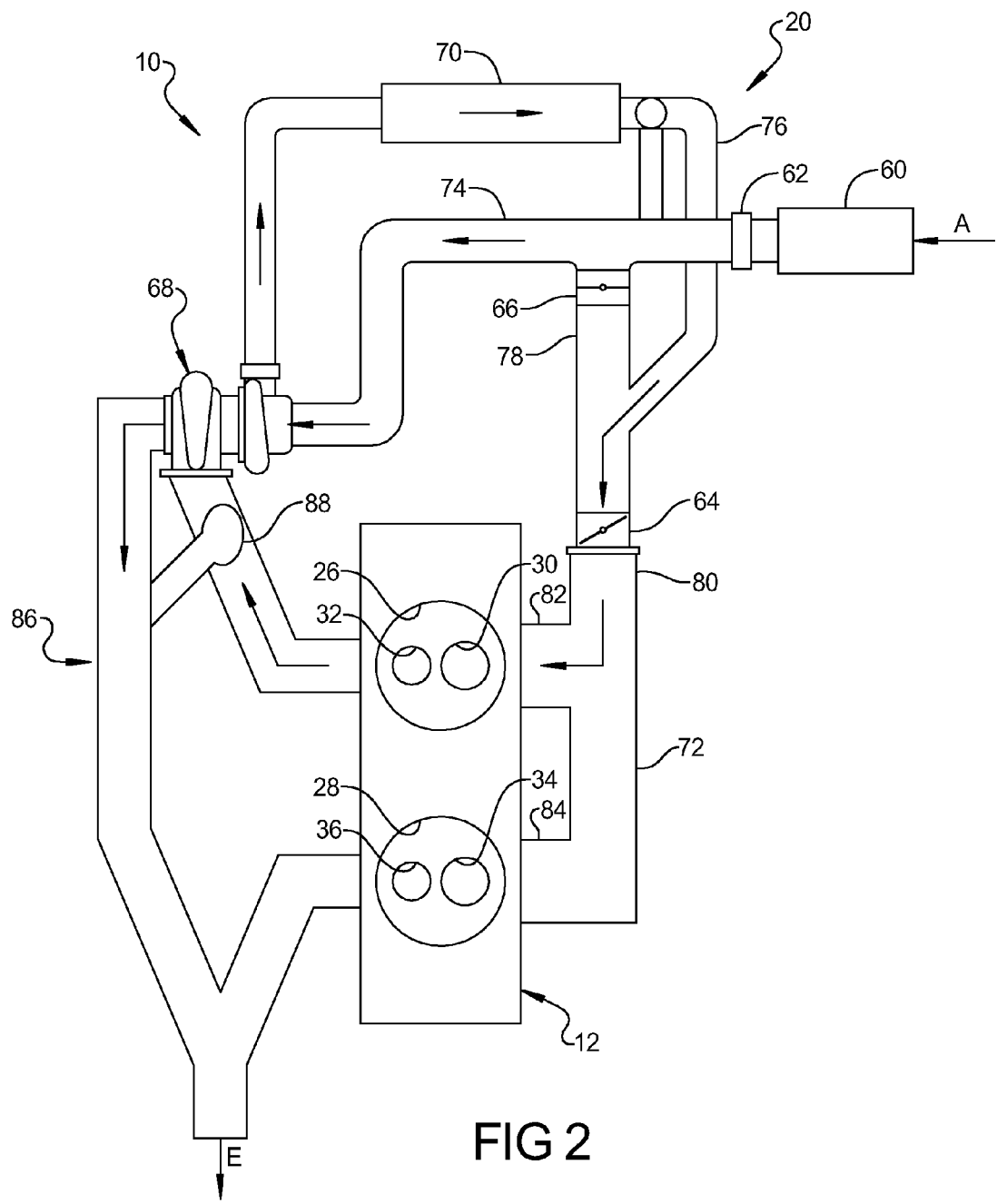
FIG. 2 is a schematic illustration of the engine assembly of FIG. 1 in a second operating mode.
Figure 3:
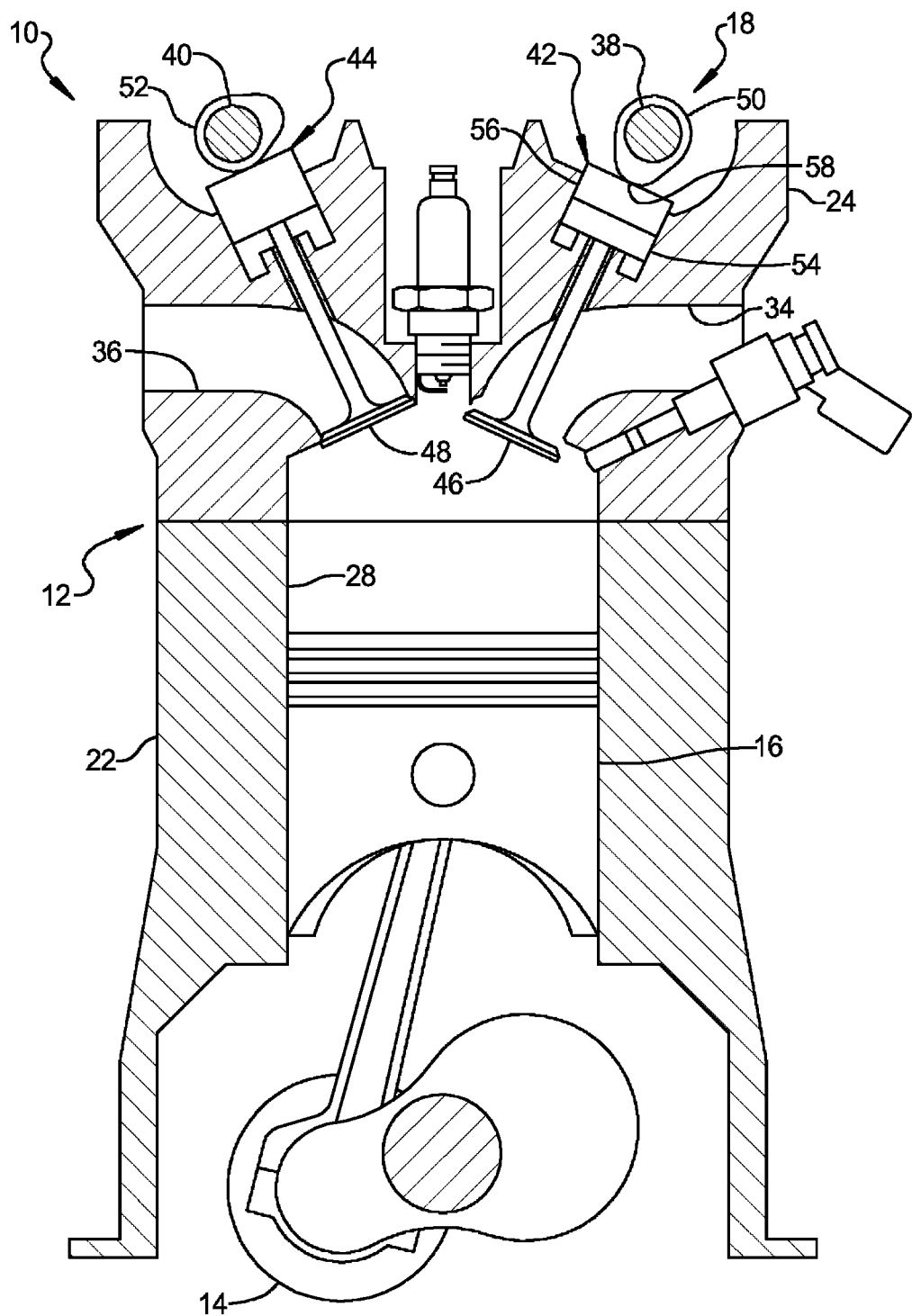
FIG. 3 is a section view of the engine assembly of FIG. 1.

An engine assembly 10 is illustrated in FIGS. 1-3 and may include an engine structure 12, a crankshaft 14, pistons 16, a valvetrain assembly 18 and an intake assembly 20. The engine structure 12 may include an engine block 22 and a cylinder head 24. The engine structure 12 may define first and second cylinders 26, 28. The description includes first and second cylinders 26, 28 for simplicity and it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

The engine structure 12 may define a first intake port 30 and a first exhaust port 32 in the cylinder head 24 associated with the first cylinder 26 and a second intake port 34 and a second exhaust port 36 in the cylinder head 24 associated with the second cylinder 28.

As seen in FIG. 3, the valvetrain assembly 18 is illustrated at the second cylinder 28 of the engine assembly 10. It is understood that the valvetrain assembly 18 may be generally similar for the first cylinder 26 and will not be described in detail for simplicity. The valvetrain assembly 18 may include first and second camshafts 38, 40 first and second valve lift mechanisms 42, 44 and intake and exhaust valves 46, 48. The intake valve 46 may be located in the second intake port 34 and the exhaust valve 48 may be located in the second exhaust port 36. The first valve lift mechanism 42 may be engaged with the intake valve 46 and a first camshaft lobe 50 defined on the first camshaft 38. The second valve lift mechanism 44 may be engaged with the exhaust valve 48 and a second camshaft lobe 52 defined on the second camshaft 40.

The first valve lift mechanism 42 may form a deactivating valve lift mechanism. More specifically, the first valve lift mechanism 42 may include a first member 54 engaged with the intake valve 46 and a second member 56 engaged with the first camshaft lobe 50. The first valve lift mechanism 42 may be operable in first and second modes. The intake valve 46 may be displaced to an open position by the first valve lift mechanism 42 during the first mode when a peak 58 of the first camshaft lobe 50 engages the first valve lift mechanism 42. The intake valve 46 may remain in a closed position during the second mode when the peak 58 of the first camshaft lobe 50 engages the first valve lift mechanism 42.

The intake assembly 20 may include an air box 60 at an inlet of the intake assembly 20, a mass air flow (MAF) sensor 62, first and second throttle valves 64, 66, a boost mechanism 68, an intercooler 70 and an intake manifold 72. The air box 60 and the MAF sensor 62 may each be used for both the first throttle valve 64 and the second throttle valve 66. A first conduit 74 may extend between and provide communication between the air box 60 and the boost mechanism 68. A second conduit 76 may extend between and provide communication between the boost mechanism 68 and the first throttle valve 64. The intercooler 70 may be located in the second conduit 76. A third conduit 78 may extend between and provide communication between the first and second conduits 74, 76. The second throttle valve 66 may be located in the third conduit 78 to selectively bypass the boost mechanism 68 as discussed below.

The first throttle valve 64 may be in communication with the first and second intake ports 30, 34. The second throttle valve 66 may be in communication with an air source (A) (via air box 60) and the first throttle valve 64 and may be located in a series flow arrangement between the air source (A) and the first throttle valve 64. The boost mechanism 68 may be in communication with the air source (A) and the first throttle valve 64 and may be located in a series flow arrangement between the air source (A) and the first throttle valve 64. Therefore, when the second throttle valve 66 is open (FIG. 1), a first flow path is defined from the air source (A) through the second throttle valve 66 to the first throttle valve 64 and when the second throttle valve 66 is closed (FIG. 2), a second flow path parallel to the first flow path is defined from the air source (A) through the boost mechanism 68 to the first throttle valve 64.

The intake manifold 72 may be located between the first throttle valve 64 and the engine structure 12. The intake manifold 72 may include an inlet 80 in communication with the first throttle valve 64, a first outlet 82 in communication with the first intake port 30 and a second outlet 84 in communication with the second intake port 34. Therefore, the first throttle valve 64 is located between the second throttle valve 66 and the inlet 80 of the intake manifold 72 and between the boost mechanism 68 and the inlet 80 of the intake manifold 72.

In the present non-limiting example, the boost mechanism 68 includes a turbocharger driven by exhaust gas (E) from the engine assembly 10. An exhaust system 86 may provide exhaust gas (E) from the engine assembly 10 to drive the boost mechanism 68. More specifically, the first exhaust port 32 may be in communication with the boost mechanism 68 and the second exhaust port 36 may be in direct communication with the exhaust system 86 at a location downstream of the boost mechanism 68. An exhaust bypass valve 88 may be located between the first exhaust port 32 and the boost mechanism 68 to selectively bypass the boost mechanism 68 as discussed below.

During a first engine operating condition (FIG. 1), the first valve lift mechanism 42 may be operated in the first mode and the second throttle valve 66 may be in an open position. Therefore, the intake air (A) may bypass the boost mechanism 68, the exhaust bypass valve 88 may be open to bypass the boost mechanism 68 and the engine assembly may operate in a naturally aspirated state. The first engine operating condition may include firing all of the cylinders in the engine assembly 10.

During a second engine operating condition (FIG. 2), the first valve lift mechanism 42 may be operated in the second mode and the second throttle valve 66 may be in a closed position. The exhaust bypass valve 88 may be closed to provide exhaust gas (E) to power the boost mechanism 68 and intake air (A) may be directed through boost mechanism 68. The second operating condition may include partial engine operation. In present non-limiting example, partial engine operation includes half of the cylinders being operated (i.e., the first cylinder 26 firing and the second cylinder 28 not being fired).

What is claimed is:

1. A method of operating an engine assembly, comprising:
providing an intake air flow to an intake assembly of the engine assembly during a first engine operating condition, the intake assembly including a first controllable throttle valve in communication with first and second cylinders of the engine assembly, a second controllable throttle valve in communication with the intake air flow and the first controllable throttle valve and located in a series flow arrangement between an air source and the first controllable throttle valve and a boost mechanism in communication with the intake air flow and the first controllable throttle valve and located in a series flow arrangement between the air source and the first controllable throttle valve,
opening the first controllable throttle valve and maintaining the second controllable throttle valve in an open position and directing the intake air flow through the first controllable throttle valve and allowing the air flow to bypass without first passing through the boost mechanism during the first engine operating condition; and
providing the intake air flow to the intake assembly during a second engine operating condition, different than the first engine operating condition, including opening the first controllable throttle valve and maintain the second controllable throttle valve in a position to direct the intake air flow through the boost mechanism and through the first controllable throttle valve,
wherein the engine assembly defines a first intake port in communication with the first cylinder and the first controllable throttle valve and a second intake port in communication with the second cylinder and the first controllable throttle valve, the engine assembly including an intake valve located in the second intake port, a valve lift mechanism engaged with the intake valve and operable in the first and second engine operating conditions,
displacing the intake valve to an open position by the valve lift mechanism during the first engine operating condition and maintaining the intake in a closed position by the valve lift mechanism during the second engine operating condition,
wherein the boost mechanism includes a turbocharger driven by exhaust gas from the engine assembly, the engine assembly defines a first exhaust port in communication with the first cylinder and the turbocharger to drive the turbocharger and a second exhaust port in communication with the second cylinder and in direct communication with an exhaust system at a location downstream of the turbocharger.

2. An engine assembly comprising:
an engine structure defining a first cylinder, a second cylinder, a first intake port in communication with the first cylinder, and a second intake port in communication with the second cylinder; and
an intake assembly including:
   a first controllable throttle valve in communication with the first and second intake ports;
   a second controllable throttle valve in communication with an air source and the first controllable throttle valve and located in a series flow arrangement between the air source and the first controllable throttle valve;
   a boost mechanism in communication with the air source and the first throttle valve and located in a series flow arrangement between the air source and the first throttle valve;
   an intake valve located in the second intake port, a valve lift mechanism engaged with the intake valve and operable in first and second modes, the intake valve being displaced to an open position by the valve lift mechanism during the first mode and the intake valve being maintained in a closed position by the valve lift mechanism during the second mode, wherein a first engine operating condition includes the valve lift mechanism being operated in the first mode and the second controllable throttle valve being controlled to be in an open position to allow airflow from the air source to bypass the boost mechanism, wherein a second engine operating condition, different than the first engine operating condition, includes the valve lift mechanism being operated in the second mode and the second controllable throttle valve being controlled to be maintained in a closed position to force airflow from the air source to pass through the boost mechanism.

3. The engine assembly of claim 2, wherein a first flow path is defined from the air source through the second controllable throttle valve to the first controllable throttle valve and a second flow path parallel to the first flow path is defined from the air source through the boost mechanism to the first controllable throttle valve.

4. The engine assembly of claim 2, wherein the intake assembly includes an intake manifold including an inlet in communication with the first controllable throttle valve and a first outlet in communication with the first intake port and a second outlet in communication with the second intake port.

5. The engine assembly of claim 2, wherein the boost mechanism includes a turbocharger in communication with the air source and the engine structure defines a first exhaust port in communication with the first cylinder and the turbocharger and a second exhaust port in communication with second cylinder and in direct communication with an exhaust system at a location downstream of the turbocharger.

6. The engine assembly of claim 2, further comprising a camshaft including a camshaft lobe engaged with the valve lift mechanism, the intake valve being displaced to an open position by a peak of the camshaft lobe during the first mode and the intake valve remaining in the closed position when the peak of the camshaft lobe engages the valve lift mechanism during the second mode.

7. The engine assembly of claim 2, wherein the intake assembly includes an intake manifold located between the first controllable throttle valve and the engine structure.

8. The engine assembly of claim 7, wherein the intake manifold includes an inlet in communication with the first controllable throttle valve, a first outlet in communication with the first intake port and a second outlet in communication with the second intake port and the first controllable throttle valve is located between the second controllable throttle valve and the inlet of the intake manifold and between the boost mechanism and the inlet of the intake manifold.

9. The engine assembly of claim 2, wherein the boost mechanism includes a turbocharger.

* * * * *